United States Patent
Duprez et al.

(12) 
(10) Patent No.: US 6,742,716 B1
(45) Date of Patent: Jun. 1, 2004

(54) THERMOSTAT

(75) Inventors: Wayne R. Duprez, Waltham, MA (US); Ken Zhao, West Roxbury, MA (US); Matthew Fratantonio, Northborough, MA (US)

(73) Assignee: Standard-Thomson Corporation, Waltham, MA (US)

( * ) Notice: Subject to any disclaimer, the term of this patent is extended or adjusted under 35 U.S.C. 154(b) by 0 days.

(21) Appl. No.: 10/376,826

(22) Filed: Feb. 28, 2003

(51) Int. Cl.⁷ .................................................. F01P 7/16
(52) U.S. Cl. ........................................ 236/34.5; 236/84
(58) Field of Search .............................. 236/34, 34.5, 84

(56) References Cited

U.S. PATENT DOCUMENTS

| | | | |
|---|---|---|---|
| 3,207,435 A | * | 9/1965 | Erickson et al. .......... 236/12.12 |
| 3,337,130 A | * | 8/1967 | Erickson ................. 236/12.12 |
| 4,055,298 A | | 10/1977 | Wilson |
| 4,537,158 A | * | 8/1985 | Saur .......................... 123/41.1 |
| 4,537,346 A | | 8/1985 | Duprez |
| 4,550,693 A | * | 11/1985 | Saur .......................... 123/41.1 |
| 4,674,679 A | * | 6/1987 | Saur .......................... 236/34.5 |
| 4,848,652 A | * | 7/1989 | Kennedy ................... 236/34.5 |
| 4,890,790 A | * | 1/1990 | Wagner ..................... 236/34.5 |
| 4,911,358 A | | 3/1990 | Mehta |
| 4,944,160 A | | 7/1990 | Malone et al. |
| 4,948,044 A | | 8/1990 | Cacciatore |
| 4,961,530 A | * | 10/1990 | Wagner ....................... 236/100 |
| 4,983,813 A | | 1/1991 | Van Tulleken et al. |
| 4,993,231 A | | 2/1991 | Torrence et al. |
| 5,018,664 A | * | 5/1991 | Butler ........................ 236/34.5 |
| 5,038,851 A | | 8/1991 | Mehta |
| 5,065,813 A | | 11/1991 | Berkeley et al. |
| 5,107,918 A | | 4/1992 | McFarlane et al. |
| 5,161,606 A | | 11/1992 | Berkeley et al. |
| 5,183,012 A | | 2/1993 | Saur et al. |
| 5,195,467 A | * | 3/1993 | Kurz .......................... 123/41.1 |
| 5,199,637 A | | 4/1993 | Adams |
| 5,211,332 A | | 5/1993 | Adams |
| 5,230,482 A | | 7/1993 | Ratz et al. |
| 5,294,047 A | | 3/1994 | Schwer et al. |
| 5,304,781 A | | 4/1994 | Stalsberg |
| 5,329,991 A | | 7/1994 | Mehta et al. |
| 5,331,996 A | | 7/1994 | Ziehm |
| 5,381,952 A | | 1/1995 | Duprez |
| 5,385,296 A | | 1/1995 | Kurz et al. |
| 5,467,921 A | | 11/1995 | Shreeve et al. |
| 5,482,209 A | | 1/1996 | Cochran et al. |
| 5,520,327 A | | 5/1996 | Shreeve et al. |
| 5,528,017 A | | 6/1996 | Wolff |
| 5,582,138 A | | 12/1996 | Ziolek et al. |
| 5,592,989 A | | 1/1997 | Lynn et al. |
| 5,611,484 A | | 3/1997 | Uhrich |
| 5,634,590 A | | 6/1997 | Gorski et al. |
| 5,782,296 A | | 7/1998 | Mehta |
| 5,799,625 A | | 9/1998 | Ziolek et al. |
| 5,873,519 A | | 2/1999 | Beilfuss |
| 5,937,942 A | | 8/1999 | Bias et al. |
| 5,979,373 A | * | 11/1999 | Sano ........................ 123/41.08 |
| 6,006,996 A | | 12/1999 | Bhatnagar |
| 6,062,483 A | | 5/2000 | Meletio |
| 6,102,749 A | | 8/2000 | Lynn et al. |
| 6,196,467 B1 | | 3/2001 | Dushane et al. |
| 6,213,404 B1 | | 4/2001 | Dushane et al. |
| 6,315,211 B1 | | 11/2001 | Sartain et al. |
| 6,371,059 B1 | | 4/2002 | Lemberger et al. |
| 2002/0047050 A1 | * | 4/2002 | Leu et al. ................. 236/12.16 |
| 2003/0150923 A1 | * | 8/2003 | Leu .............................. 236/34.5 |

* cited by examiner

*Primary Examiner*—William E. Tapolcai
(74) *Attorney, Agent, or Firm*—Barnes & Thornburg

(57) ABSTRACT

A thermostat comprises a valve and an electric valve actuator to move the valve against a valve seat. The thermostat comprises a wax motor responsive to temperature to move the valve away from the valve seat.

23 Claims, 6 Drawing Sheets

THERMOSTAT

BACKGROUND OF THE DISCLOSURE

The present disclosure relates to thermostats.

A thermostat may be used to control flow of coolant between a heated device and a heat exchanger to control the temperature of the heated device. The heated device may be, for example, an engine that heats up as it operates. The heat exchanger may be, for example, a radiator associated with the engine to cool liquid coolant that circulates through the engine for cooling the engine. The thermostat may be The thermostat may be used to direct coolant from the engine back to the engine so as to bypass the radiator to warm up the engine when the engine is cold. When the engine reaches a desired operating temperature, the thermostat may allow coolant to begin to flow to the radiator to prevent engine overheating.

SUMMARY OF THE DISCLOSURE

The present invention comprises one or more of the following features or combinations thereof. A thermostat is provided for controlling flow of coolant between a heated device and a heat exchanger. The thermostat comprises a valve and an electric valve actuator to move the valve relative to a valve seat to control coolant flow.

According to one aspect of the invention, the electric valve actuator comprises an output member movable to a valve-seating position to position the valve against the valve seat. A wax motor of the thermostat is responsive to a predetermined temperature to move the valve away from the valve seat when the output member is positioned in the valve-seating position.

According to another aspect of the invention, the valve comprises a coolant passageway. The coolant passageway extends axially through the valve to facilitate axial movement of the valve in the coolant by the output member.

Other features of the thermostat may involve a housing. The housing comprises a coolant inlet and first and second coolant outlets. The coolant inlet is used to admit coolant from the heated device into the housing. The first coolant outlet is used to discharge coolant to the heat exchanger. The second coolant outlet is use to discharge coolant back to the engine to bypass the heat exchanger.

The electric valve actuator may comprise an electric motor, such as a stepper motor, to axially move the output member between a first valve-seating position and a second valve-seating position. In the first valve-seating position, the output member is positioned to position the valve against a first valve seat to block coolant flow between the coolant inlet and the first coolant outlet and apart from a second valve seat to allow coolant flow between the coolant inlet and the second coolant outlet. In the second valve-seating position, the output member is positioned to position the valve against the second valve seat to block coolant flow between the coolant inlet and the second coolant outlet and apart from the first valve seat to allow coolant flow between the coolant inlet and the first coolant outlet.

The wax motor may comprise a piston and a thermal expansion device with wax. The wax is responsive to the predetermined temperature to relatively axially move the piston and the thermal expansion device to axially move the valve away from the first valve seat to allow flow between the coolant inlet and the first coolant outlet when the electric motor positions the output member in the first valve-seating position.

Additional features and advantages of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
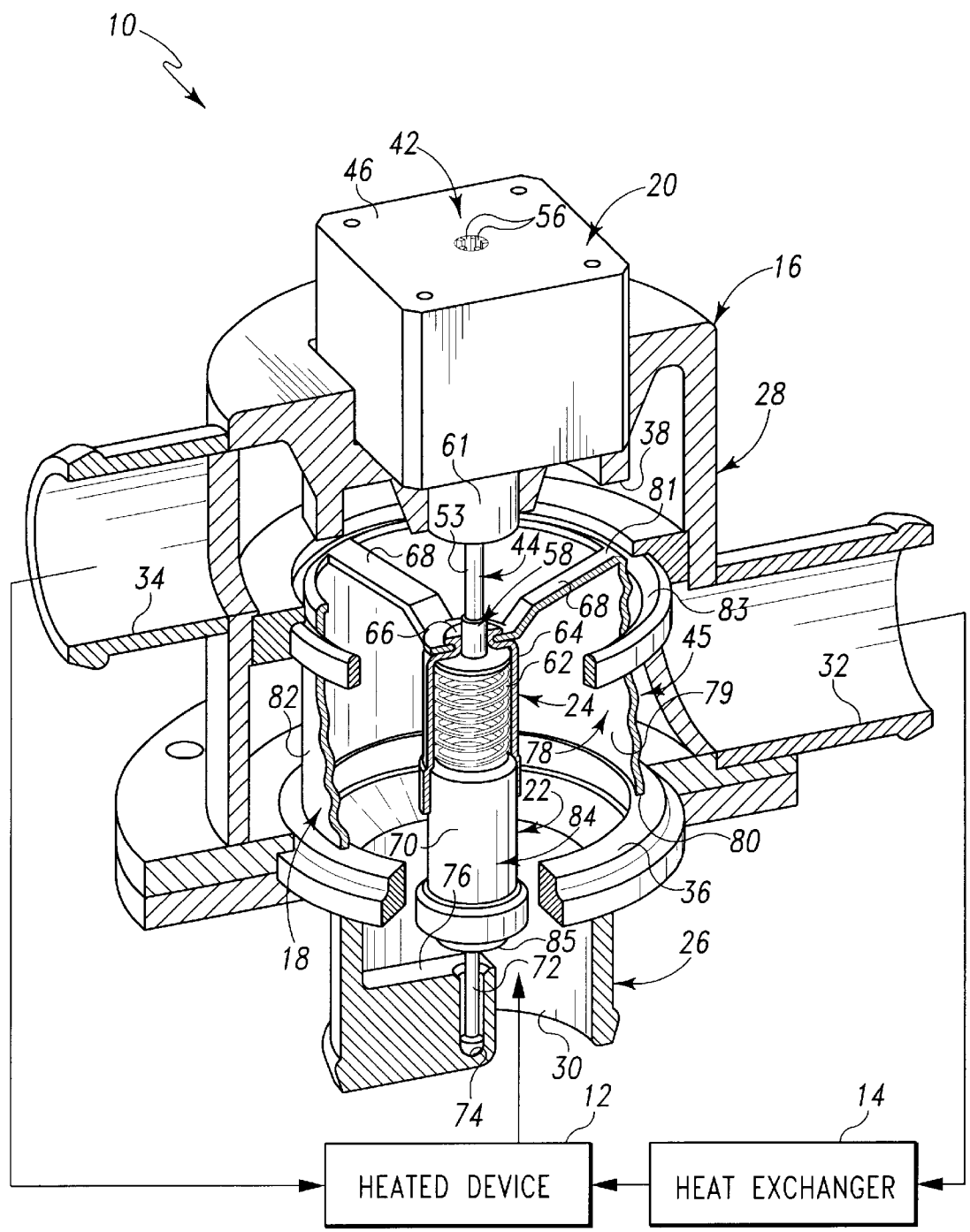
FIG. 1 is a perspective view of a thermostat, with portions broken away, for controlling flow of coolant between a heated device (e.g., an engine) and a heat exchanger (e.g., a radiator)

A thermostat 10 is illustrated in FIG. 1. The thermostat 10 controls flow of coolant between a heated device 12 and a heat exchanger 14 to control the temperature of the heated device 12. The heated device 12 may be, for example, an engine that heats up when it operates. The heat exchanger 14 may be, for example, a radiator to lower the temperature of coolant flowing through the engine.

The thermostat 10 is operable in four modes: a bypass flow mode, a relief flow mode, an intermediate flow mode, and a heat exchanger flow mode. In the bypass flow mode (see FIGS. 1 and 2), the thermostat 10 blocks flow of coolant from the heated device 12 and the heat exchanger 14 so that coolant bypasses the heat exchanger 14 and flows back to the heated device 12. In the relief flow mode (see FIG. 3), the thermostat 10 directs flow of coolant to the heat exchanger 14 to be cooled thereby and returned to the heated device 12 when the temperature of the coolant reaches a predetermined temperature. In the intermediate flow mode (see FIG. 4), the thermostat 10 directs some coolant to flow to the heat exchanger 14 to be cooled thereby and returned to the heated device 12 and some coolant to flow back to the engine 12 without flowing through the heat exchanger 14. In the heat exchanger flow mode (see FIG. 5), the thermostat 10 is configured to direct flow of coolant to the heat exchanger 14 to be cooled thereby and returned to the heated device 12 and configured to block coolant from bypassing the heat exchanger 14.

The thermostat 10 comprises a thermostat housing 16, a valve 18, an electric valve actuator 20, a wax motor 22, and a spring unit 24, as illustrated in FIGS. 1–5. The electric valve actuator 20 is configured to move the valve 18 inside the housing 16 for operation of the thermostat 10 in the bypass flow mode, intermediate flow mode, and heat exchanger flow mode. The wax motor 22 is configured to move the valve 18 for operation of the thermostat 10 in the relief flow mode. The spring unit 24 interconnects the valve 18, the actuator 20, and the wax motor 22. Each of the housing 16, valve 18, actuator 20, wax motor 22, and spring unit 24 are now discussed in more detail.

Figure 2:
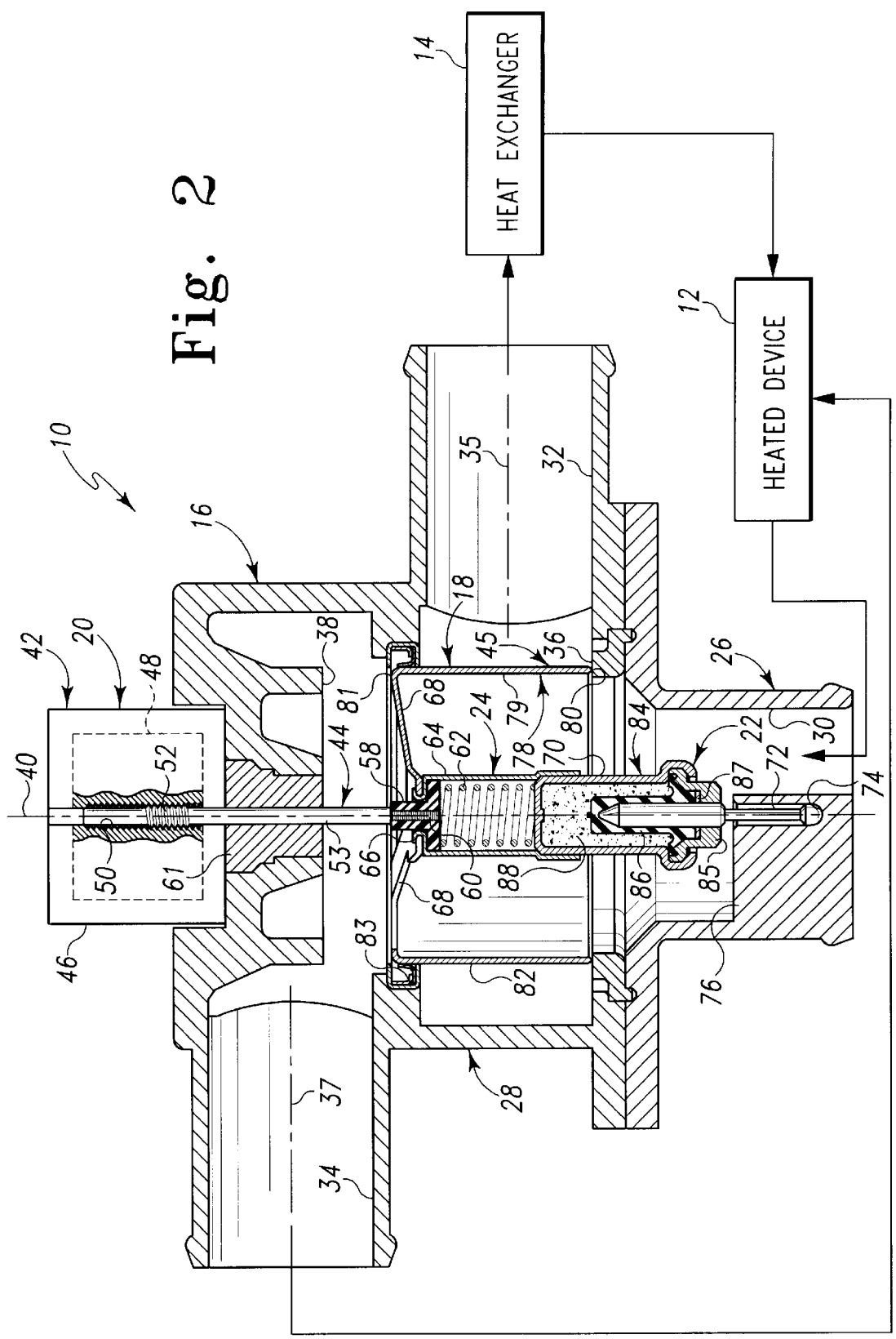
FIG. 2 is a sectional view of the thermostat in a bypass flow mode in which an electric motor positions an output member in a first valve-seating position to position a valve against a first valve seat so that coolant bypasses the heat exchanger and flows back to the heated device.

The housing 16 comprises an inlet portion 26 and an outlet portion 28 coupled together, as illustrated in FIGS. 1–5. The inlet portion 26 comprises a coolant inlet 30 to admit coolant from the heated device 12 into the housing 16. The outlet portion 28 comprises a first coolant outlet 32 to discharge coolant to the heat exchanger 14 and a second coolant outlet 34 to discharge coolant back to the heated device 12 for bypass of the heat exchanger 14. The coolant outlets 32, 34 have parallel central axes 35, 37, respectively, which are perpendicular to a central axis 40 of the coolant inlet 30, as illustrated in FIG. 2. The terms "axial," "axially," "radial," "radially," "coaxial," and "coaxially" as used herein are relative to the axis 40.

The thermostat 10 comprises an annular first valve seat 36 and an annular second valve seat 38, as illustrated in FIGS. 1–5. The first valve seat 36 is coupled to the housing 16 in a recess defined by the inlet and outlet portions 26, 28. The second valve seat 28 is formed monolithically with the outlet portion 28. The valve seats 36, 38 are spaced axially apart along an axis 40.

The electric valve actuator 20 is configured to move the valve 18 along the axis 40 between the valve seats 36, 38, as illustrated in FIGS. 1–5. The actuator 20 is configured to move the valve 18 in this manner in response to electric pulses from a controller (not illustrated) that controls the heated device 12. The controller may be, for example, an engine control module for an engine.

Figure 3:
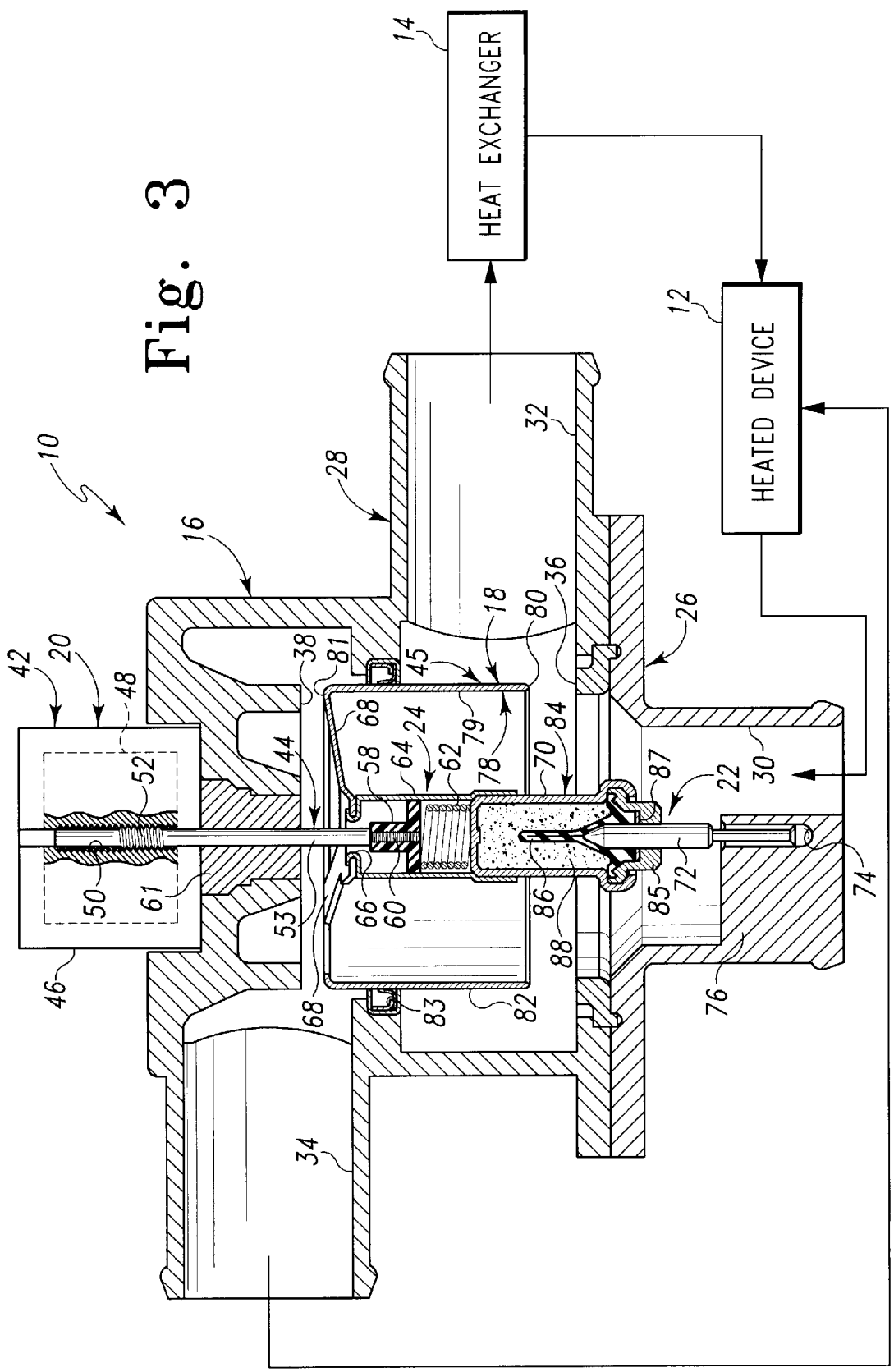
FIG. 3 is a sectional view of the thermostat in a relief flow mode in which a wax motor moves the valve away from the first valve seat to allow flow of coolant from the heated device to the heat exchanger when the output member is positioned in the first valve-seating position and the temperature of the coolant reaches a predetermined temperature.
Figure 4:
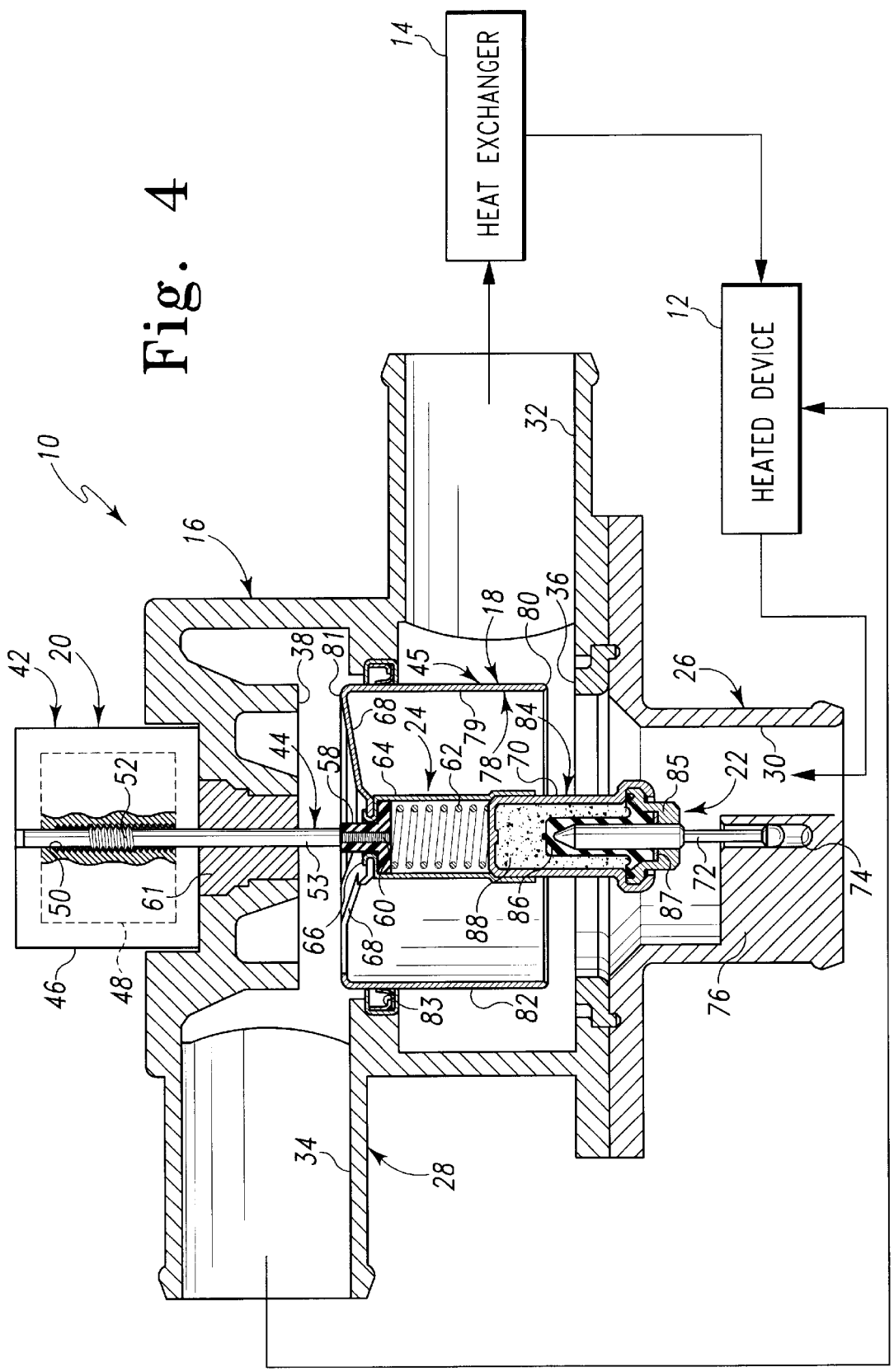
FIG. 4 is a sectional view of the thermostat in an intermediate flow mode in which the output member is retracted by the electric motor to position the valve apart from the first valve seat and a second valve seat to allow some coolant to flow to the heat exchanger and to allow some coolant to bypass the heat exchanger.
Figure 5:
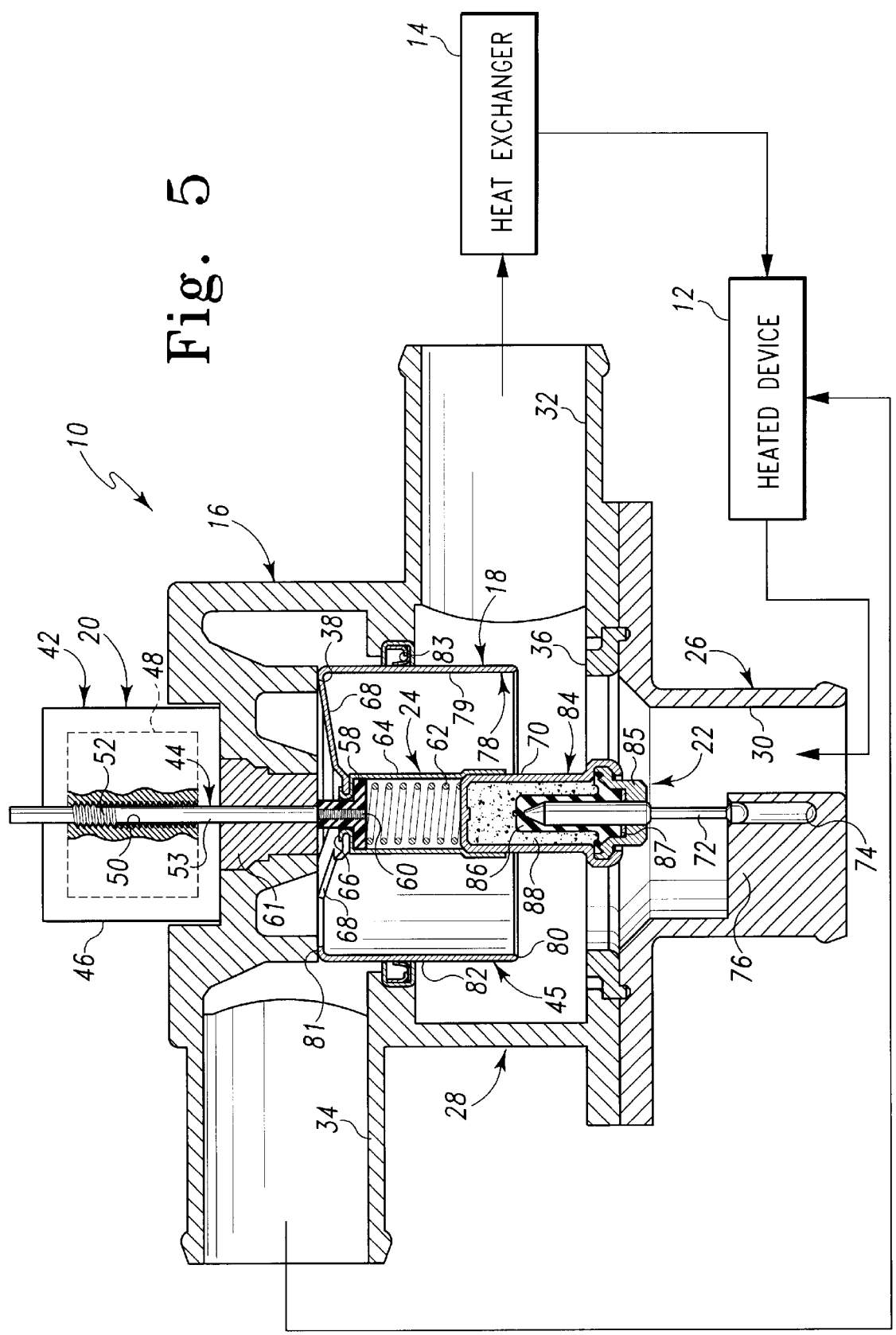
FIG. 5 is a sectional view of the thermostat in a heat exchanger flow mode in which the output member is retracted by the electric motor to a second valve-seating position to position the valve against the second valve seat to allow coolant flow to the heat exchanger.
Figure 6:
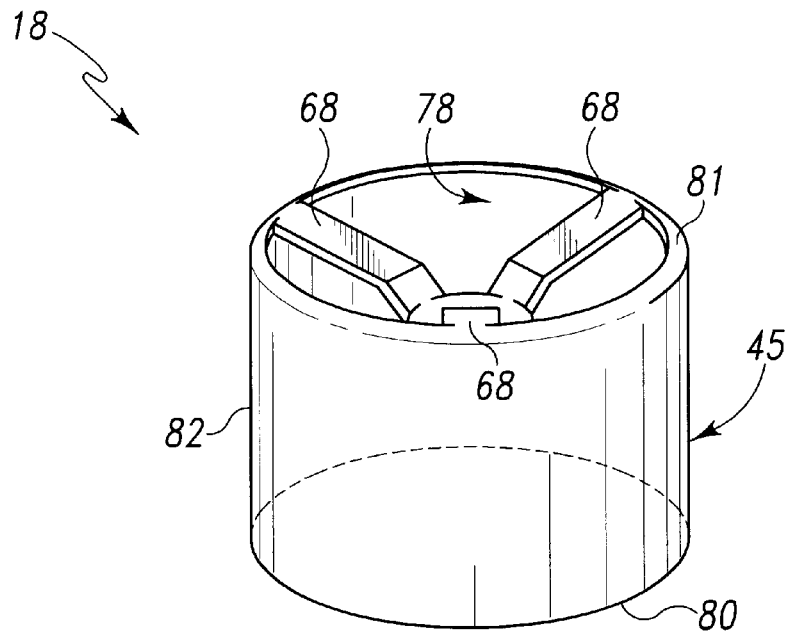
FIG. 6 is a perspective view of the valve.

The electric valve actuator 20 comprises an electric motor 42 and an output member 44, as illustrated in FIGS. 1–5. The electric motor 42 is configured to move the output member 44 axially along the axis 40 between a variety of positions to move the valve 18 therewith in coolant in response to electric pulses from the controller. In particular, the electric motor 42 is configured to move the output member 44 between a first valve-seating, as illustrated in FIGS. 1 and 2, a second valve-seating position, as illustrated in FIG. 5, and any number of intermediate positions between the first and second valve-seating positions, as illustrated with respect to one such intermediate position in FIG. 4. In the first valve-seating position, the output member 44 is configured to position a valve sleeve 45 of the valve 18 against the first valve seat 36 to establish the bypass flow mode. In the second valve-seating position, the output member 44 is configured to position the sleeve 45 against the second valve seat 38 to establish the heat exchanger flow mode. In the intermediate positions, the output member 44 is configured to space the sleeve 45 apart from the first and second valve seats 36, 38 to establish the intermediate flow mode.

The illustrative electric motor 42 comprises an electric motor housing 46 and a rotatable armature 48. The housing 46 is mounted in a recess of the outlet portion 28 so as to be stationary relative thereto, as illustrated in FIGS. 1–5. The armature 48 is illustrated mostly diagrammatically in FIGS. 2–5 and is mounted for rotation in the housing 46 about the axis 40 and the output member 44. The armature 48 comprises internal threads 50 that mate with external threads 52 on an elongated body 53 of the output member 44 to move the output member 44 axially inwardly and outwardly to a desired axial position upon rotation of the armature 48. Once the electric motor 42 has moved the output member 44 to the desired axial position, the electric motor 42 does not require electric power to maintain the output member 44 in that position due to engagement between the internal and external threads 50, 52.

The electric motor 42 is, for example, a stepper motor with a step angle of about 1.8°. It is within the scope of this disclosure for the electric motor 42 to be any type of electric motor suitable for moving the output member 44 axially inwardly and outwardly.

The output member 44 is keyed to the electric motor housing 46 to prevent rotation of the output member 44 about the axis 40 upon rotation of the armature 48. In particular, the elongated body 53 of the output member 44 comprises axially extending splines (not illustrated) that are spaced around the elongated body 53 and fit in corresponding grooves 56 (see FIG. 1) formed in the electric motor housing 46. There are illustratively five such splines and five such grooves 56 although it is within the scope of this disclosure for there to be any number of splines and grooves 56.

The output member 44 comprises a flared body 58 and an internal screw 60, as illustrated in FIGS. 1–5. The screw 60 is fixed to the elongated body 53 and extends axially inwardly therefrom. The flared body 58 is screwed onto the internal screw 60 to be mounted thereto.

An output member seal 61 illustrated in FIGS. 1–5 is mounted to the outlet portion 28 for sealing engagement with the output member 44 to block leakage of coolant therebetween into the electric motor 42. In particular, the seal 61 surrounds the elongated body 53 for sealing engagement therewith.

The spring unit 24 comprises a spring 62 and a spring sleeve 64 surrounding the spring 62, as illustrated in FIGS. 1–5. One end portion of the sleeve 64 comprises a lip 66 that defines an aperture through which the flared portion 58 extends into the sleeve 64 for engagement with the spring 62. The lip 66 further defines an annular groove into which radially extending connector arms 68 of the valve 18 extend to couple the valve 18 to the spring unit 24. The opposite end portion of the sleeve 64 is fixed to a cup 70 of the wax motor. The spring 62 is positioned between and engages the flared body 58 and the cup 70.

Axially inward movement of the output member 44 is transmitted to the valve 18 via the spring unit 24 and the cup 70. In particular, as the electric motor 42 moves the output member 44 axially inwardly, the flared body 58 pushes against the spring 62 which, in turn, pushes against the cup 70 to move the spring 62 and cup 70 axially inwardly. Since the connector arms 68 are coupled to the spring sleeve 64 via the annular groove in the lip 66, the valve 18 moves axially inwardly with the output member 44, the spring 62, and the cup 70. The spring 62 acts as an overshoot spring to take up further axially inward movement of the output member 44 when the cup 70 is prevented from further axially inward movement due to engagement between a piston 72 of the wax motor 22 and a piston bearing surface 74 provided by a bore formed in a flange 76 mounted in the inlet portion 26.

Axially outward movement of the output member 44 is transmitted to the valve 18 via the spring sleeve 64. In particular, as the electric motor 42 moves the output member 44 axially outwardly, the flared body 58 pulls the spring sleeve 64 axially outwardly therewith. In turn, the spring sleeve 64 moves the valve 18 axially outwardly.

The valve 18 is configured to facilitate axial movement thereof in coolant by the output member 44. In particular, the valve 18 comprises a coolant passageway 78 extending axially all the way through the valve 18, as illustrated in FIGS. 1–7. As such, as the output member 44 moves the valve 18 in coolant, resistance on the valve 18 due to the coolant is minimized. Further, the valve 18 is coaxial with the output member 44 to minimize bending moments on the output member 44.

The valve sleeve 45 comprises the coolant passageway 78, as illustrated in FIGS. 1–7. In particular, the valve sleeve 45 comprises a radially inner surface 79 and axially inner and outer ends 80, 81. The surface 79 and ends 80, 81 provide the coolant passageway 78. The axially inner end 80 provides an inlet of the coolant passageway 78. The axially outer end 81 provides an outlet of the coolant passageway 78. The illustrative valve sleeve 45 is generally cylindrical and surrounds the spring unit 24 so that the spring unit 24 is positioned in the coolant passageway 78.

Figure 7:
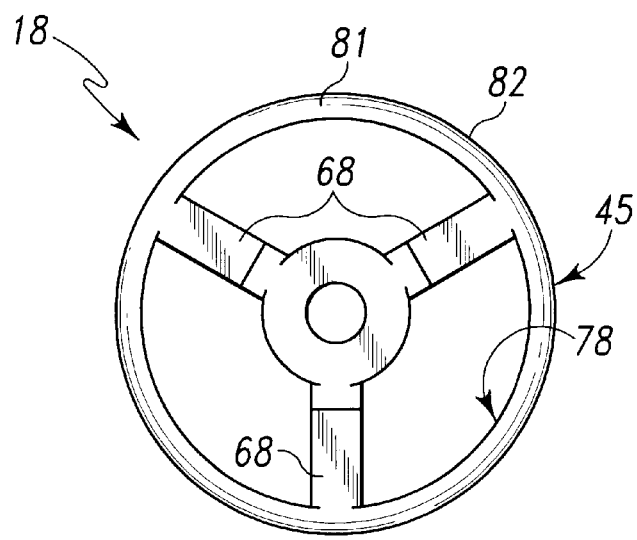
FIG. 7 is a top plan view of the valve.

The connector arms 68 extend radially inwardly from the axially outer end 81, as illustrated in FIG. 7. The illustrative valve 18 comprises three such connector arms 68 which are spaced about 120° apart around the axially outer end 81 of the sleeve 45. It is within the scope of this disclosure for the valve 18 to comprise any number of connector arms 68.

A radially outer surface 82 of the valve sleeve 45 sealingly engages an annular valve seal 83, as illustrated in FIGS. 1–5. The valve seal 83 is configured to block leakage of coolant from the second coolant outlet 34 between the surface 82 and the outer portion 28 to the first coolant outlet 32 when the axially inner end 80 engages the first valve seat 36 and is configured to block leakage of coolant from the first coolant outlet 32 between the surface 82 and the outer portion 28 to the second coolant outlet 34 when the axially outer end 81 engages the second valve seat 38.

The wax motor 22 is responsive to a predetermined temperature (e.g., a temperature in the range of from about 225° F. to about 240° F.) of the coolant to establish the relief flow mode of the thermostat, as illustrated in FIG. 3. In particular, the wax motor 22 moves the valve 18 away from the first valve seat 36 to allow flow from the heated device 12 to the heat exchanger 14 when the electric motor 42 positions the output member 44 in the first valve-seating position and the coolant reaches the predetermined temperature. This relief flow mode would be useful if the output member 44 were to become "stuck" in the first valve-seating position due to, for example, a failure in the system responsible for positioning the output member 44. For example, if the electric power connector coupled to the electric motor 42 to provide electric pulses from the controller to the electric motor 42 were to become electrically uncoupled from the electric motor 42, the output member 44 would remain in the first valve-seating position. Without the wax motor 22, the output member 44 would therefore maintain the valve 18 against the first valve seat 36 so as to block flow of coolant from the heated device 12 to the heat exchanger 14 and to direct coolant back to the heated device 12. In such a situation, the heated device 12 would be at risk of overheating. The wax motor 22 is used to unseat the valve 18 from the first valve seat 36 even though the output member 44 remains in the first valve-seating position to reduce the risk of such overheating.

The components of the wax motor 22 are shown in FIGS. 2–5. The wax motor 22 comprises the piston 72 and a thermal expansion device 84. The thermal expansion device 84 comprises the cup 70, a cover 85, a piston sleeve 86, a seal 87, and temperature responsive wax 88. The cover 85 closes an end opening of the cup 70. The piston sleeve 86 receives the piston 72 for relative movement therebetween and is made of, for example, a fluroelastomer such as VITON®. The seal 87 prevents excursion of the piston sleeve 86 out of the cup 70 upon relative movement between the piston 72 and the piston sleeve 86 and is made of, for example, RULON®. The wax 88 fills a volume in the cup 70 between the cup 70 and the piston sleeve 86.

The wax 88 causes relative movement between the piston 72 and the thermal expansion device 84 in response to the predetermined temperature, as indicated in FIG. 2. In particular, the wax 88 melts and expands when it is exposed to the predetermined temperature. As the wax 88 expands, it squeezes the piston sleeve 86 against the piston 72 to cause relative movement between the piston 72 and the thermal expansion device 84. Since the piston 72 engages the piston bearing surface 74 when the output member 44 is positioned in the first valve-seating position, the expansion of the wax 88 causes the thermal expansion device 84 to move axially outwardly against the spring 62. As such, the cup 70 moves the spring sleeve 64 and valve 18 axially outwardly so that the valve 18 disengages the first valve seat 36 to allow flow of coolant from the heated device 12 to the heat exchanger 14 even though the output member 44 remains in the first valve-seating position.

The spring 62 acts as a restoring spring to move the thermal expansion device 84 back to its initial position relative to the output member 44 when, for example, the coolant temperature drops below the predetermined temperature and the wax re-solidifies or when the output member 44 moves away from the first valve-seating position. The piston 72 will disengage the piston bearing surface 74 upon movement of the output member 44 away from the first valve-seating position, as illustrated in FIGS. 4 and 5. The output member 44, the valve 18, and the wax motor 22 are coaxial, as illustrated in FIG. 2–5.

Although certain illustrative embodiments have been disclosed in detail, variations and modifications exist within the scope and spirit of the invention as described and defined in the following claims.

What is claimed is:

1. A thermostat comprising
   a valve,
   an electric valve actuator comprising an output member axially movable to a valve-seating position to move the valve into contact with a valve seat,
   a bearing surface, and
   a wax motor responsive to a predetermined temperature to act against the bearing surface to move the valve axially away from the valve seat and relative to the bearing surface when the output member is positioned in the valve-seating position.

2. The thermostat of claim 1, wherein the electric valve actuator comprises an electric motor to move the output member.

3. The thermostat of claim 2, wherein the electric motor is a stepper motor.

4. The thermostat of claim 1, comprising a spring between the output member and the wax motor.

5. The thermostat of claim 1, wherein the wax motor comprises a piston and a thermal expansion device comprising temperature responsive wax expandable to relatively move the piston and the thermal expansion device to move the valve away from the valve seat when the output member is positioned in the valve-seating position.

6. The thermostat of claim 5, comprising a spring unit comprising a spring positioned between the output member and the thermal expansion device and a sleeve that surrounds the spring and extends between the thermal expansion device and the valve to transmit motion of the thermal expansion device to the valve.

7. The thermostat of claim 5, wherein the piston engages the bearing surface when the output member is positioned in the valve-seating position and disengages the bearing surface when the output member moves away from the valve-seating position.

8. The thermostat of claim 1, comprising a housing in which the valve and the wax motor are positioned, wherein the wax motor comprises a piston and a thermal expansion device that receives the piston and is responsive to temperature to cause relative movement between the thermal expansion device and the piston, and the housing comprises a flange formed to include a bore receiving the piston and providing the bearing surface.

9. The thermostat of claim 2, wherein the wax motor is arranged to move the valve axially toward the electric motor when the output member is positioned in the valve-seating position and the wax motor is exposed to the predetermined temperature.

10. A thermostat for controlling flow of coolant to control the temperature of a heated device, the thermostat comprising
a house having a bearing surface a valve positioned in the housing,
an electric valve actuator comprising an output member axially movable relative to the housing to a valve-seating position to move the valve relative to the housing axially in coolant into contact with a valve seat, the valve comprising a coolant passageway extending axially through the valve to receive coolant therethrough to facilitate axial movement of the valve in the coolant by the output member, and
a wax motor responsive to a predetermined temperature to act against the housing to move the valve axially away from the valve seat and relative to the bearing surface when the output member is positioned in the valve-seating position.

11. The thermostat of claim 10, wherein the electric valve actuator comprises an electric motor to move the output member.

12. The thermostat of claim 11, wherein the electric motor is a stepper motor.

13. The thermostat of claim 10, wherein the valve comprises a sleeve comprising the coolant passageway, and the sleeve comprises a first end providing an inlet of the coolant passageway and a second end providing an outlet of the coolant passageway.

14. The thermostat of claim 10, comprising axially spaced first and second valve seats, wherein the electric valve actuator comprises an electric motor to axially move the output member between a first valve-seating position positioning the valve against the first valve seat and apart from the second valve seat and a second valve-seating position positioning the valve against the second valve seat and apart from the first valve seat.

15. The thermostat of claim of claim 10, comprising a spring unit positioned in the coolant flow passageway, wherein the valve comprises a valve sleeve and an arm extending radially inwardly from the valve sleeve, the valve sleeve comprises the coolant passageway, the spring unit comprises an overshoot spring and a spring sleeve, the overshoot spring is positioned between the output member and the wax motor to take up motion of the output member relative to the wax motor due to axial movement of the output member beyond the valve-seating position, the sprint sleeve surrounds the overshoot spring and is coupled to the wax motor and the arm.

16. The thermostat of claim 10, comprising a housing in which the valve and the wax motor are positioned, wherein the wax motor comprises a piston and a thermal expansion device that receives the piston and is responsive to temperature to cause relative movement between the thermal expansion device and the piston, and the housing comprises a flange formed to include a bore receiving the piston and providing the bearing surface.

17. A thermostat for controlling flow of coolant between a heated device and a heat exchanger to control the temperature of the heated device, the thermostat comprising
a housing comprising a coolant inlet to admit coolant from the heated device into the housing, a first coolant outlet to discharge coolant to the heat exchanger, and a second coolant outlet to discharge coolant back to the heated device to bypass the heat exchanger,
a valve positioned in the housing,
first and second valve seats,
an electric valve actuator comprising an output member and an electric motor to axially move the output member relative to the housing between a first valve-seating position positioning the valve against the first valve seat to block coolant flow between the coolant inlet and the first coolant outlet and apart from the second valve seat to allow coolant flow between the coolant inlet and the second coolant outlet and a second valve-seating position positioning the valve against the second valve seat to block coolant flow between the coolant inlet and the second coolant outlet and apart from the first valve seat to allow coolant flow between the coolant inlet and the first coolant outlet, and
a wax motor positioned in the housing and comprising a piston and a thermal expansion device comprising wax responsive to a predetermined temperature to cause the piston to act against the housing to move the thermal expansion device axially relative to the piston to move the valve axially away from the first valve seat to allow flow between the coolant inlet and the first coolant outlet when the electric motor positions the output member in the first valve-seating position.

18. The temperature control system of claim 17, wherein the valve, output member, and wax motor are coaxial.

19. The temperature control system of claim 17, comprising a spring unit, wherein the valve comprises a valve sleeve and an arm extending radially inwardly from the valve sleeve, the spring unit comprises a spring positioned between the output member and the thermal expansion device and a spring sleeve that surrounds the spring and extends between the thermal expansion device and the arm to move the valve sleeve away from the first valve seat in response to relative movement between the piston and the thermal expansion device due to expansion of the wax when the electric motor positions the output member in the first valve-seating position.

20. The temperature control system of claim 17, wherein the housing comprises a piston bearing surface which the piston engages when the electric motor positions the output member in the first valve-seating position and which the piston disengages when the electric motor positions the output member in the second valve-seating position.

21. The temperature control system of claim 17, wherein the electric motor requires no electric power to maintain the output member in the first and second valve-seating positions.

22. The temperature control system of claim 17, wherein the valve defines a coolant passageway extending axially through the valve to facilitate movement of the valve in the coolant by the output member.

23. The thermostat of claim 17, wherein the bearing surface is provided by a bore formed in a flange included in the housing and coupled to the coolant inlet.

* * * * *